United States Patent [19]
Billington, III

[11] Patent Number: 6,135,509
[45] Date of Patent: Oct. 24, 2000

[54] SAFETY COLLAR AND TENDON ASSEMBLY FOR THREADED CONNECTIONS

[75] Inventor: Charles J. Billington, III, Modesto, Calif.

[73] Assignee: Billington Welding & Manufacturing, Inc., Modesto, Calif.

[21] Appl. No.: 09/255,441

[22] Filed: Feb. 22, 1999

[51] Int. Cl.[7] .................................................. F16L 55/00
[52] U.S. Cl. ........................ 285/92; 285/316; 403/315; 403/316
[58] Field of Search ................................. 285/92, 82, 80; 403/315, 316; 411/87, 88, 122, 123, 124; 70/229, 230, 232

[56] References Cited

U.S. PATENT DOCUMENTS

| | | | |
|---|---|---|---|
| 1,365,477 | 1/1921 | Gabriel et al. | 285/80 |
| 4,787,770 | 11/1988 | Lewis | 285/82 |
| 5,350,201 | 9/1994 | Bynum | 285/92 |
| 5,362,111 | 11/1994 | Harbin | 285/92 |
| 5,490,693 | 2/1996 | Fisher et al. | 285/92 |
| 5,823,702 | 10/1998 | Bynum | 403/316 |

*Primary Examiner*—Lynne H. Browne
*Assistant Examiner*—Aaron Dunwoody
*Attorney, Agent, or Firm*—Flehr Hohbach Test Albritton & Herbert

[57] ABSTRACT

A safety collar and tendon assembly (24) for joining a female connector (22) and a male connector (20), comprising a collar member (26) having at least one tab (30, 32) with a radially inwardly projecting leg (35) which extends into an annular recess (39) between the male connection (20) and the female connection (22) to prevent axial movement of the collar member (26) along the connection assembly (16) and thereby maintain engagement of collar (26) around a non-circular (hexagonal) surface (47) of the female connector (22). Also part of the safety collar and tendon assembly (24) is a tendon or length of wire (40) which is secured at one end to collar (26) and at its other end is either secured to a similar collar on an adjacent threaded connection or to a fixed structure. Unthreading of the connection assembly (16) is prevented by the tendon (40), which prevents rotation of collar (26).

9 Claims, 3 Drawing Sheets

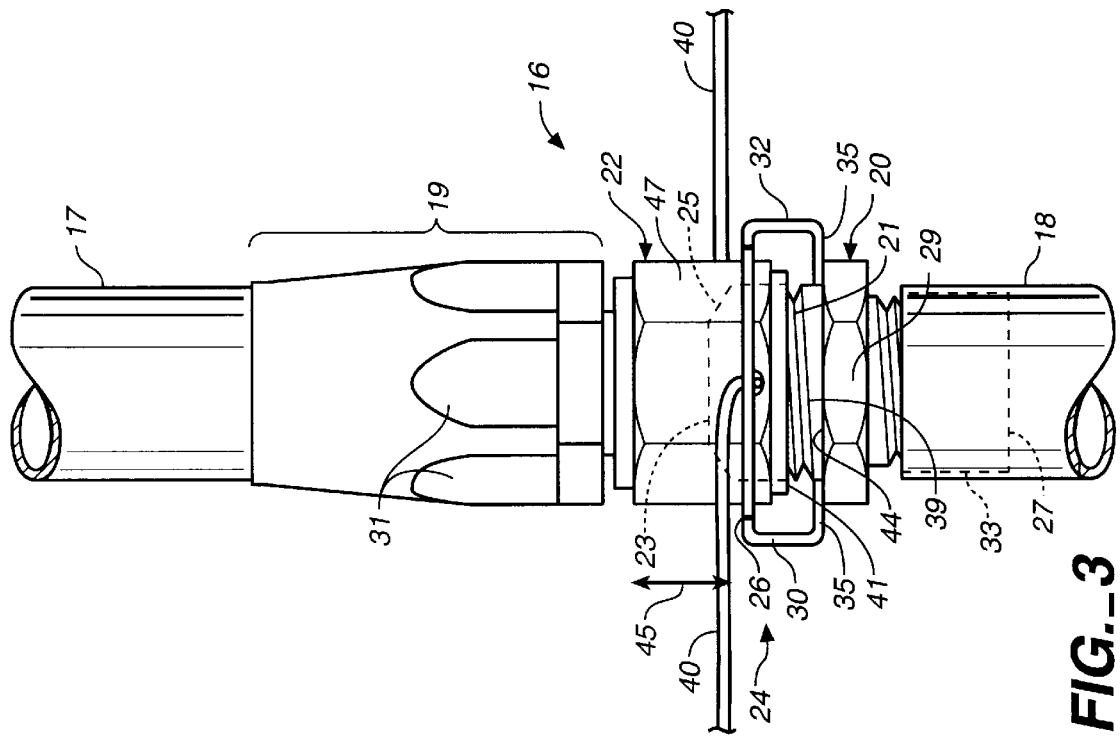
FIG._3
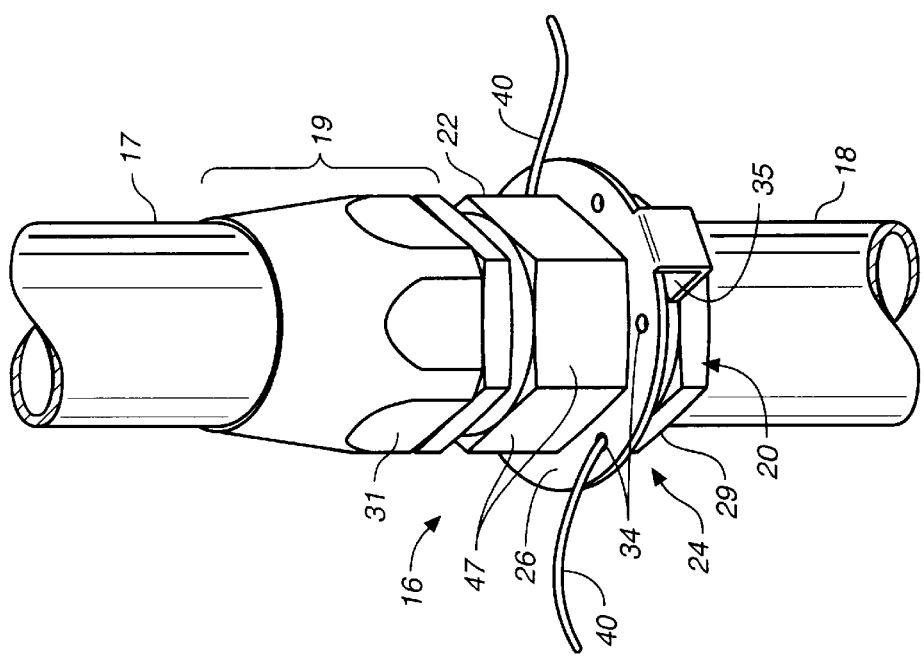
FIG._1

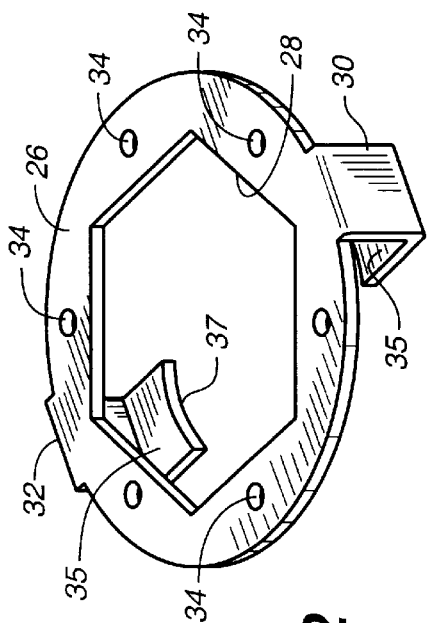
FIG._2
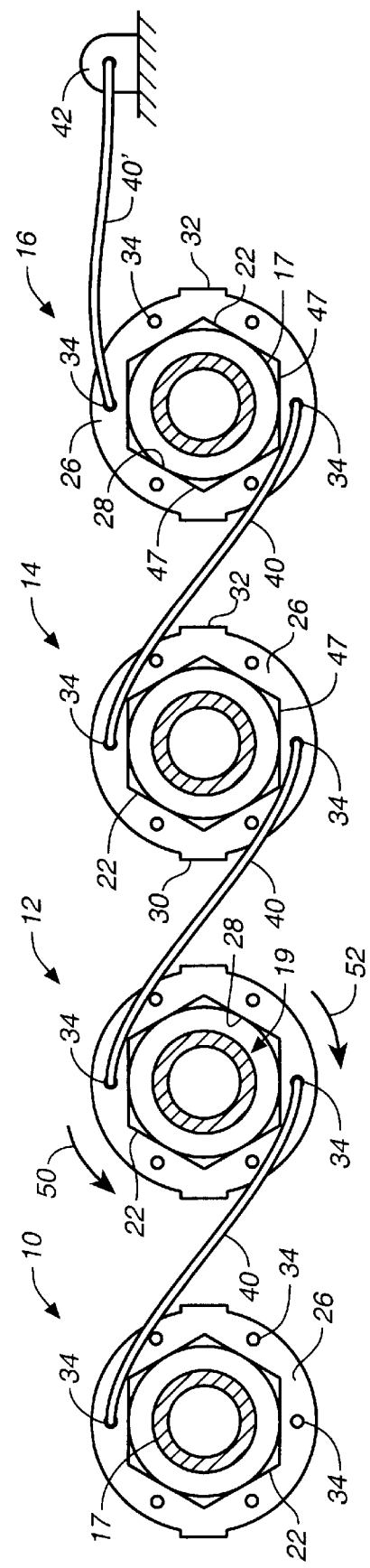
FIG._5

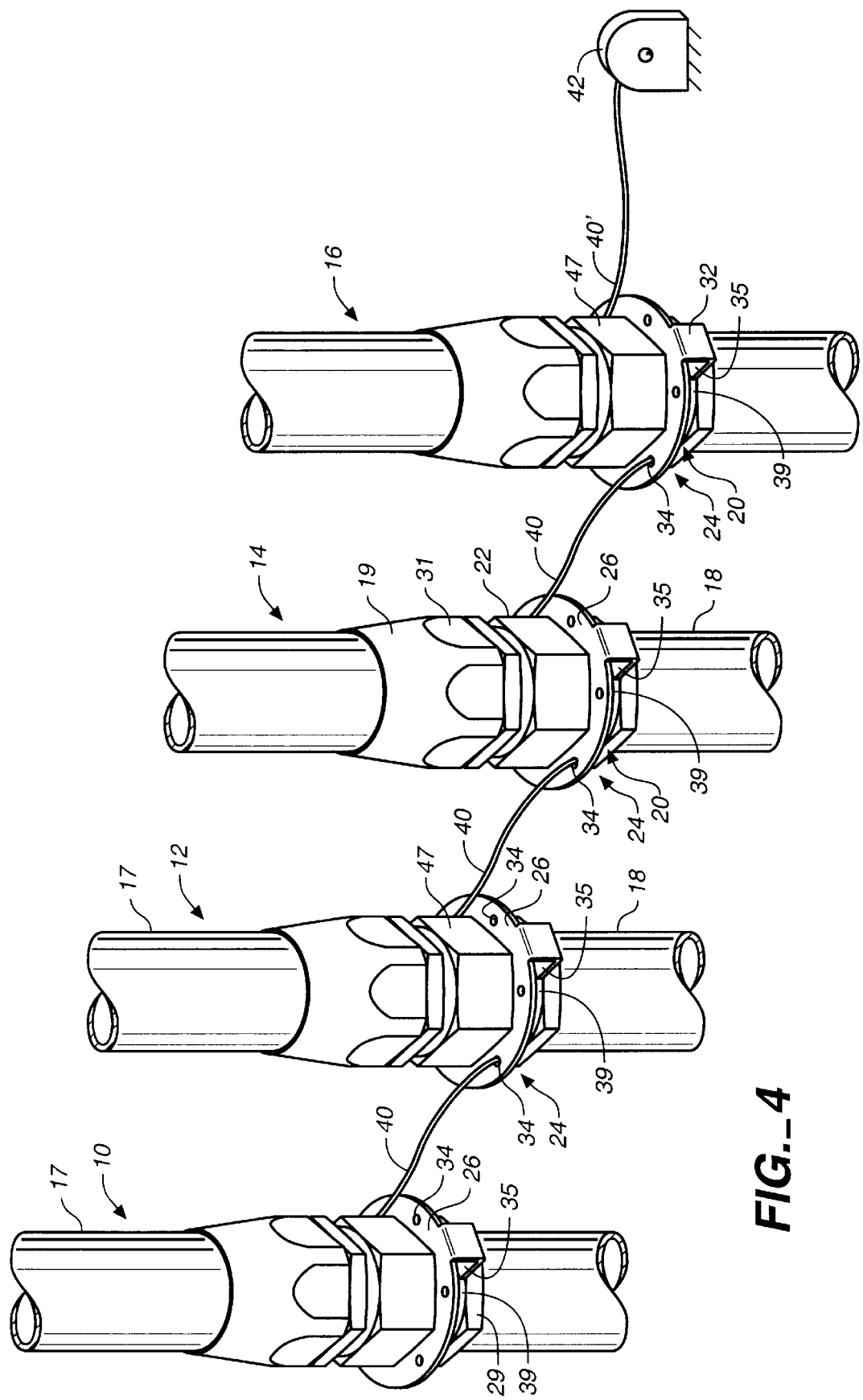
FIG._4

SAFETY COLLAR AND TENDON ASSEMBLY FOR THREADED CONNECTIONS

TECHNICAL FIELD

The present invention relates to threaded connections and other types of threaded coupling assemblies and, more particularly, relates to safety locking devices that prevent unthreading of threaded connections, such as fluid coupling assemblies.

BACKGROUND ART

Various methods have been developed for preventing the unthreading of threaded couplings. U.S. Pat. Nos. 3,702,707, and 4,927,187 and 5,348,349 disclose different types of self-locking threaded fasteners wherein male and female threaded fitting components are secured together and locked, sometimes by a locking wire, a lanyard or a tendon.

U.S. Pat. Nos. 465,848, and 2,431,735, and 3,648,749 disclose fastener assemblies with locking devices in the form of a connecting wire or tendon wherein multiple threaded fasteners are locked against rotation by means of a connecting tendon held by adjacent fasteners.

U.S. Pat. No. 5,624,218 of Dauwalter discloses a safety locking assembly for wheel studs that comprises a cap that fits over a lug nut and is secured against rotation by tendons or lanyards anchored between adjacent caps. Each cap is held on its respective lug nut by a press fit, force fit or detent structure. The cap design of Dauwalter works well for its intended application of securing threaded fasteners like lug nuts, which have free ends, against unthreading from a tightened condition, but the inherent design of the safety cap limits its application to wheel studs and similar types of threaded fasteners.

The present invention is directed at an improved collar and tendon safety assembly that simplifies the use of locking tendons or wires to secure commonly used fluid couplings against unthreading for both original and retrofit applications.

DISCLOSURE OF INVENTION

Briefly described, the safety collar and tendon assembly of the present invention is designed for preventing unthreading of a threaded connection which includes threaded male and female connectors. A collar member is provided which interengages one of the male or the female connectors in a manner preventing relative rotation therebetween. For example, the collar can have a center opening slidably mating with a non-circular portion of the connector on which it is mounted, such as the hexagonal flats of the portion of the connector used to tighten the assembly together as a unit. The collar has at least one tab or projection adapted to project axially and radially into a recess, preferably between the male and female connectors, in a manner preventing movement axially along the threaded connection assembly. The collar, therefore, is trapped between the male and female connectors when they are screwed together. The assembly further includes at least one tendon, usually a length of wire, secured at one end to the collar and adapted for securing at its other end to a stationary structure in a manner preventing rotation of the collar and thus unthreading of the male and female connectors.

These and other features, objects, and advantages of the present invention will become apparent from the following description of the Best Mode for Carrying Out the Invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a pictorial view of the safety collar and tendon assembly of the present invention;

FIG. 2 is an enlarged, pictorial view of the collar member of the assembly shown in FIG. 1;

FIG. 3 is a side elevation view of the safety collar and tendon assembly of FIG. 1;

FIG. 4 is a pictorial view of a plurality of safety collar and tendon assemblies of the present invention used to secure adjacent threaded fluid couplings;

FIG. 5 is a plan view of the safety collar and tendon assemblies of FIG. 4.

BEST MODE OF CARRYING OUT THE INVENTION

Reference will now be made in detail to the preferred embodiment of the invention, an example of which is illustrated in the accompanying drawings. While the invention will be described in conjunction with the preferred embodiment, it will be understood that the described embodiment is not intended to limit the invention specifically to that embodiment. On the contrary, the invention is intended to cover alternatives, modifications and equivalents, which may be included within the spirit and scope of the invention, as defined by the appended claims.

Referring now to FIGS. 1 and 3, the safety collar and tendon assembly of the present invention, which is generally designated 24, is shown as mounted on a threaded connection assembly or fluid coupling assembly, generally designated 16. Connection assembly 16, as shown in the drawing, is used to fluid couple two conduits 17 and 18 together, and connection assembly 16 is formed for fluid flow through the connection assembly. Such fluid couplings, known as "AN Fittings," are sold by many companies, for example, by Aero-Quip, Inc. under the trademark AERO-QUIP. They typically are used as fuel line connections in airplanes, race cars, boats and other vehicles.

Fluid coupling 16 typically include a conduit-receiving assembly 19 which secures conduit 17 to the one of the coupling members. Conduit-receiving assembly 19 is here shown mounted for rotation about a longitudinal axis to a threaded female connector 22. A male connector 20 having threads 21, which extend to proximate upper end 23 is threadably mounted into internally threaded female connector 22. Upper end 23 of male connector 20 also can be seen to be beveled at beveled surface 25 to mate with a similar beveled surface (not shown) in an internal portion of the conduit-receiving assembly 19, which portion extends axially down to seal against beveled surface 25 so as to prevent leakage of fluid at end 23. Lower end 27 of male connector 20 typically will be taper threaded at 33, or can have a JIC thread and O-ring, so as to enable it to be coupled to conduit 18. Often end 27 is directly screwed into a threaded port in the engine block, a valve body, or the like, rather than being screwed into conduit 18.

Intermediate ends 23 and 27 of male connector 20 is a wrench-engageable structure 29, such as hexagonal flats, which allows male connector 20 to be engaged by a wrench and screwed into conduit 18 (or an engine block) and allows tightening of the female connector down onto the male connector. Similarly, female connector 22 will typically be provided with a hexagonal or another wrench-engageable structure 47 so that the male and female connectors of fluid coupling 16 can be secured in tight, threaded interengagement using two wrenches. Pivoting conduit receiving assembly 19 relative to female connector 22 allows rotation of the female connector with one wrench without rotating conduit 17, while the male connector is held still by the other wrench, during the tightening process until the last fractional turn so as not to twist conduit 17. At the last fraction of a turn the beveled surface 25 seats into the corresponding internal surface of assembly 19, and the entire connection assembly 16 tightens up to act as a relatively rigid unit. The flats 31 on component 19 can be used to resist twisting of conduit 17 during the last fractional turn of the seating process.

Such fluid coupling assemblies, as above noted, are well known in the industry. While they are generally quite effective, over time vibrations of the type commonly present in applications involving internal combustion engines can cause unthreading of male connector 20 and female connector 22 or, less commonly, male connector 20 and conduit 18. The result can be fuel leakage in substantial amounts from coupling assembly 16, which presents an obvious safety problem. Collar and tendon assembly 24 of the present invention prevents such unthreading in an application in which the threaded components of assembly 16 do not have a free end over which a safety fitting cap can be easily placed.

Collar and tendon assembly 24 includes a collar member 26 that is adapted to be positioned around one of the male and female connectors prior to threading the connectors together. As discussed in more detail with reference to FIGS. 4 and 5, collar and tendon assembly 24 also includes at least one wire or tendon 40 for securing the collar to a structure which will prevent rotation of the collar in a direction causing unthreading of threaded connection assembly 16. In the figures, two tendons 40 are shown in the form of lengths of wire 40 that join collar 26 to similar collars mounted on adjacent threaded connections. It will be understood, however, that a single wire or tendon 40 is all that is required to prevent unthreading of assembly 16.

As shown in FIG. 2, collar 26 preferably includes a hexagonal center opening 28 for positioning around the wrench-receiving flats 47 on hexagonal female threaded connector 22, and at least one, and preferably a pair, of axially downwardly extending and radially inwardly extending projections or tabs 30, 32. A plurality of small holes 34 can be provided in the collar for securing tendon 40 to the collar. Tabs 30, 32 each include a short radially inwardly projecting leg 35 which most preferably is formed with an inwardly concaved arcuate surface 37. Surface 37 slidably mates with a cylindrical surface 39 on male connector 20, in a manner described in more detail below. Holes 34 are located periodically around collar 26 and preferably are positioned at about 60° intervals, but they could be located at other points around the circumference of collar 26 and a single opening or a single protrusion or other structure can be used to secure tendon 40 to collar 26.

Referring to FIG. 3, collar 26 is positioned by sliding the collar onto one of the male and female connectors, in this case onto hexagonal flats 47 of female connector 22. Tabs or projections 30, 32 extend axially down and legs 35 project radially inwardly into a recess between the male and female connectors. Thus, legs 35 project inwardly between a shoulder 41 on female connector 22 and shoulder 44 on male connector 20. In this position, collar 26 is prevented from moving axially up or down, in the direction of arrow 45, by an amount sufficient to cause hexagonal opening 28 to slide off of hexagonal flats 35. The non-circular engagement of collar 26 and non-circular surfaces 35 on connector 22 is always maintained by tab ends 35. As the female connector is screwed down on male connector 20, arcuate ends 37 of tabs 30,32 rotate on cylindrical surface 39 until the tabs are trapped between shoulders 41 and 44 of the two connectors. This holds the hexagonal opening 28 of the collar on the wrench-engageable flats 47 of connector 22. In this assembly the flats 47 are longer than flats 29 on the male connector and positioning of the collar on the female connector by tabs 30, 32 is accordingly preferable. Using the flats of male connector 20, however, also is within the scope of the assembly of the present invention.

Referring to FIG. 4, multiple threaded connections 10, 12, 14, 16 are shown in relatively close proximity to each other, with each assembly being formed like the threaded connection of FIG. 1. Such multiple connections may be found, for example, in a series of fuel lines for an internal combustion engine. Each collar and tendon assembly 24 includes at least one length of wire 40, or another flexible tendon, which interconnect collars 26. The opposite ends of the wires 40 may be secured to the collars using openings 34 in each collar. Wire length 40' is shown with one end connected to a fixed structural member 42, which may be any fixed, non-movable part of an engine or other stationary structure. It will be understood, however, that wire length 40' could be eliminated since all that is required is that a single length of wire interconnect two collars in a direction opposing unthreading of the male and female connectors.

As shown in FIG. 5, tendon 40 extends from an opening 34 in an adjacent collar to opening 34 of the next adjacent collar. The threaded female connectors 32 are tightened in the direction indicated by arrow 52 and the purpose of collars 26 and wire segments 40 is to prevent counter rotation, or unthreading of the female connector from the male connector by rotation in the direction of arrow 50. The unthreading or rotation of any of the female connectors in the direction of arrow 50 causes the adjacent collars to tighten in the direction of arrow 52, thus preventing any further unthreading of connection assemblies. The end assembly 16 cannot be rotated in the direction of arrow 50 because of tendon 40 which connects it to assembly 14. Thus, tendon 40' is optional, but it also could be used alone instead of a tendon 40 between assemblies 14 and 16.

An advantage of the safety collar and tendon assembly of the present invention is its wide application to a variety of existing threaded connections that already have hexagonal ends for tightening and a recess between the connectors which can receive the inward legs of the collar tabs. Opening 28 of collar 26 can be varied to conform to another non-circular exterior shape of the male or female connector.

Furthermore, collar and tendon assembly 24 allows the use of inexpensive lengths of wire, or other types of flexible tendons, for interconnecting the collars, and also allows for easy connection of the wire lengths to the openings in the collars, preferably by crimping or bending of the wire ends.

Referring again to FIG. 3, one of the additional advantages of collar and tendon assembly 24 is that, if the threaded ends 23 and 27 of male connector 20 are of the same hand (both right-handed or both left-handed), the collar and tendon assembly will secure both the threaded connection between male connector 20 and female connector 22 against unthreading, and the additional threaded connection between male connector 20 and tube 18 (or the engine block) against unthreading. Tendons 40 prevent the female connector 22 from rotating in a counterclockwise direction (FIG. 1) which is required to unthread the female connector from the male connector if both have right-handed threads. If end 27 of male connector and the female thread inside tube 18 also have right-handed threads, male connector 20 must also be rotated in a counterclockwise direction to unthread from tube 18. Such a counterclockwise rotation of male connector 20, however, tightens the male connector inside female connector 22 and the female connector cannot rotate in a counterclockwise direction because of tendons 40. Thus, the present collar and tendon assembly secures both threaded connections shown in the fluid coupling of the drawing against unthreading.

The foregoing descriptions of a specific embodiment of the present invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

The invention claimed is:

1. A collar and tendon assembly for preventing unthreading of a threaded connection assembly including a threaded male connector and a threaded female connector, comprising:

a collar member with a non-circular center opening dimensioned to slide onto a non-circular section of one of the male and the female connectors, the collar member being adapted to interengage with the non-circular section of one of the male and the female connectors in a manner limiting relative rotation therebetween, the collar member further including an axially extending and an inwardly extending projection therefrom adapted to protrude radially inwardly into a recess provided in the connection assembly in a manner limiting axial movement of the collar member along the connection assembly in order to maintain the collar member in interengagement with the non-circular section of one of the male and the female connectors; and at least one tendon secured at one end to the collar member and adapted for securing at the other end to a structure preventing rotation of the collar member and the one of the male and the female connector in a direction unthreading the connector-member upon which the collar member is mounted upon securement of the other end of the tendon to the structure.

2. The assembly of claim 1 wherein, the center opening of the collar member slides axially over an end and onto one of the male and the female connector, and the center opening is configured to interengage with the one of the male and the female connector in a manner limiting relative rotation.

3. The assembly of claim 2 wherein, the axially and inwardly extending projection is formed to extend into a recess between the male and the female connector and is further formed for rotation of the collar member with the one of the male and the female connector during threading of the male and the female connectors together to form the connection assembly.

4. A collar and tendon assembly for preventing counter rotation of a first threaded connection including a first threaded male connector and a first threaded female connector, comprising:

a first collar member having an opening formed for slidable axial mounting over an end of the one of the male and the female connector, the collar member being adapted to slide axially therealong to a position at which the opening interengages one of the connectors in a manner preventing substantial relative rotational movement therewith, the collar member including an axially extending tab having an inwardly projecting end adapted to project radially into a recess in the threaded connection in a manner preventing axial movement of the collar member along one of the connectors by an amount allowing relative rotational movement of the collar member and the one of the connectors; and at least one length of wire secured at one end to the collar member and adapted for securing at the other end to a structure preventing unthreading of the collar member and the one of the connectors from the other of the connectors.

5. The assembly of claim 4 wherein, the collar member is adapted to mount onto the female connector and the tab is adapted to extend to a recess between the male connector and the female connector.

6. The assembly of claim 4 wherein, the structure is a second collar and tendon assembly mounted on a second threaded connection, the second collar and tendon assembly including a second collar member mounted on the second threaded connection, and the length of wire being secured to the second collar member in a manner causing tightening of the second threaded connection and tightening of the first threaded connection upon unthreading of either threaded connection.

7. The assembly of claim 4 wherein, the opening in the collar member is formed to axially slide onto the one of the male and the female connectors as the male and the female connectors are threaded together.

8. The assembly of claim 7 wherein, the recess is provided by a cylindrical surface recessed between two radially outwardly projecting shoulders, and the inwardly projecting end of the tab has a concaved arcuate surface adapted to rotate around the cylindrical surface to facilitate rotation of the collar member with the connector on which it is mounted during threading of the male and the female connectors together.

9. The assembly of claim 4 wherein, the first threaded connection includes a second male connector and a second female connector axially aligned with the first male connector and first female connector with one of the second male connector and the second female connector being integrally connected to one of the first male connector and the first female connector for rotation therewith and the second male connector and second female connector having threads of the same hand as the first male connector and the fist female connector; and the collar and tendon assembly being mounted on one of the first male connector and first female connector with the tendon secured to the structure to prevent unthreading of both the first male connector and the first female connector as well as the second male connector and the second female connector.

* * * * *

UNITED STATES PATENT AND TRADEMARK OFFICE
CERTIFICATE OF CORRECTION

PATENT NO. : 6,135,509
DATED : October 24, 2000
INVENTOR(S) : CHARLES J. BILLINGTON, III It is certified that error appears in the above-identified patent and that said Letters Patent is hereby corrected as shown below:

ON THE TITLE PAGE

[56] REFERENCES CITED
U.S. PATENT DOCUMENTS

| | | |
|---|---|---|
| 465,848 | 12/1891 | Gray |
| 936,862 | 10/1909 | Burgest et al. |
| 1,973,658 | 9/1934 | Redding |
| 2,431,735 | 12/1947 | Cyr |
| 2,751,755 | 6/1956 | Fowler |
| 3,648,749 | 3/1972 | Warren |
| 3,702,707 | 11/1972 | Rosan, Sr. |
| 4,927,187 | 5/1990 | Sanford et al. |
| 5,348,349 | 9/1994 | Sloane |
| 5,624,218 | 4/1997 | Dauwalter |

UNITED STATES PATENT AND TRADEMARK OFFICE
CERTIFICATE OF CORRECTION

PATENT NO. : 6,135,509
DATED : October 24, 2000
INVENTOR(S) : CHARLES J. BILLINGTON, III It is certified that error appears in the above-identified patent and that said Letters Patent is hereby corrected as shown below:

IN THE CLAIMS:

Claim 9, column 6, line 52, delete "fist" and insert therefor --first--.

Signed and Sealed this

Eighth Day of May, 2001

Attest:

NICHOLAS P. GODICI

Attesting Officer	Acting Director of the United States Patent and Trademark Office